United States Patent
Tabata et al.

(10) Patent No.: US 10,384,939 B2
(45) Date of Patent: Aug. 20, 2019

(54) OZONE GENERATION APPARATUS

(71) Applicant: Toshiba Mitsubishi-Electric Industrial Systems Corporation, Chuo-ku (JP)

(72) Inventors: Yoichiro Tabata, Tokyo (JP); Yujiro Okihara, Tokyo (JP); Shinichi Nishimura, Tokyo (JP)

(73) Assignee: Toshiba Mitsubishi-Electric Industrial Systems Corporation, Chuo-ku (JP)

(*) Notice: Subject to any disclaimer, the term of this patent is extended or adjusted under 35 U.S.C. 154(b) by 0 days.

(21) Appl. No.: 15/506,130

(22) PCT Filed: Oct. 29, 2014

(86) PCT No.: PCT/JP2014/078726
§ 371 (c)(1),
(2) Date: Feb. 23, 2017

(87) PCT Pub. No.: WO2016/067382
PCT Pub. Date: May 6, 2016

(65) Prior Publication Data
US 2017/0267525 A1  Sep. 21, 2017

(51) Int. Cl.
C01B 13/11 (2006.01)
C23C 4/11 (2016.01)

(52) U.S. Cl.
CPC .............. C01B 13/11 (2013.01); C23C 4/11 (2016.01); C01B 2201/10 (2013.01); C01B 2201/12 (2013.01); C01B 2201/22 (2013.01); C01B 2201/62 (2013.01); C01B 2201/76 (2013.01)

(58) Field of Classification Search
None
See application file for complete search history.

(56) References Cited

U.S. PATENT DOCUMENTS

| | | | | |
|---|---|---|---|---|
| 4,892,713 A | * | 1/1990 | Newman | C01B 13/11 422/186.04 |
| 5,211,919 A | * | 5/1993 | Conrad | B01J 19/088 422/186.07 |
| 5,529,760 A | * | 6/1996 | Burris | B01J 19/088 422/186.07 |
| 2005/0158221 A1 | * | 7/2005 | McNulty | A61L 2/202 422/186.07 |

(Continued)

FOREIGN PATENT DOCUMENTS

| | | |
|---|---|---|
| JP | 8-12304 A | 1/1996 |
| JP | 11-292519 | 10/1999 |
| JP | 2003-160310 A | 6/2003 |

(Continued)

OTHER PUBLICATIONS

Japanese Office Action dated Jun. 6, 2017 in Patent Application No. 2016-556096 (with English Translation).

(Continued)

*Primary Examiner* — Kishor Mayekar
(74) *Attorney, Agent, or Firm* — Oblon, McClelland, Maier & Neustadt, L.L.P.

(57) ABSTRACT

In an ozone generation apparatus, a discharge cell includes a first electrode part, a second electrode part, and a dielectric partition plate. The first electrode part and the second electrode part face each other, and the dielectric partition plate is provided between the first and second electrode parts.

7 Claims, 4 Drawing Sheets

(56) References Cited

U.S. PATENT DOCUMENTS

2006/0049738 A1    3/2006  Tabata et al.

FOREIGN PATENT DOCUMENTS

| | | |
|---|---|---|
| JP | 2004-142963 A | 5/2004 |
| JP | 2004-359537 A | 12/2004 |
| JP | 2005-220019 | 8/2005 |
| JP | 2011-88821 A | 5/2011 |
| JP | 2013-120670 A | 6/2013 |
| JP | 2013-155073 A | 8/2013 |
| TW | 201315678 A1 | 4/2013 |
| WO | 2005/080263 A1 | 9/2005 |

OTHER PUBLICATIONS

International Preliminary Report on Patentability and Written Opinion dated May 11, 2017 in PCT/JP2014/078726 (with English language translation).
International Search Report dated Dec. 16, 2014, in PCT/JP2014/078726, filed Oct. 29, 2014.
Office Action dated Apr. 8, 2016, in Taiwanese Patent Application No. 104100215 (with partial English translation), (Total 7 pages).
Office Action dated Mar. 19, 2018 in Korean Patent Application No. 10-2017-7006437 (with English machine translation obtained from the JPO), citing reference AO therein, 8 pages.
Korean Office Action dated Aug. 7, 2018 for Korean Application No. 10-2017-7006437, with English translation thereof.
Korean Office Action dated Sep. 19, 2018 for Korean Patent Application No. 10-2017-7006437, and English translation thereof.

* cited by examiner

F I G . 4
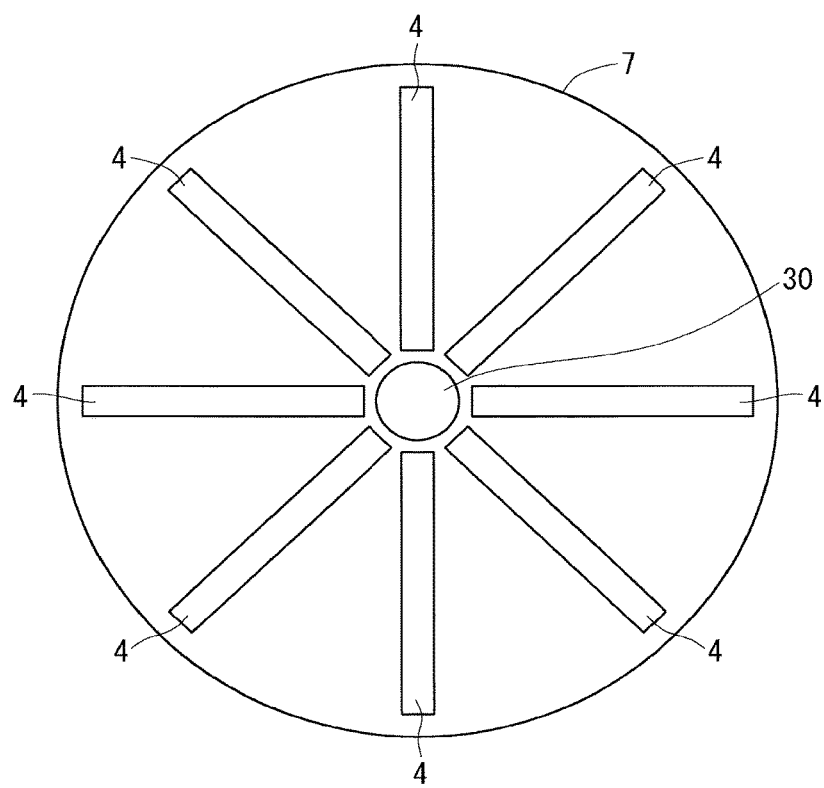

OZONE GENERATION APPARATUS

TECHNICAL FIELD

The present invention relates to an ozone generation apparatus for generating ozone, and particularly to an ozone generation apparatus capable of generating an ozone gas having a large ozone generation amount (=high concentration×gas flow rate) with a compact configuration.

BACKGROUND ART

Since the ozone gas has a high oxidation reactivity, it is heavily used in a field of manufacturing a semiconductor device. The ozone gas forms an insulating oxide film of a wafer, for example, so that it is used for an ozone bleaching of a pulp and an ozone sterilization, for example.

Patent Document 1 describes a conventional technique for enhancing an ozone generation volume density η (=Y/V), for example. Herein, Y indicates an ozone generation amount (=high concentration×gas flow rate) and V indicates a volume of an ozone gas generation apparatus.

In the technique according to Patent Document 1, a discharge gap length in a discharge space in which a dielectric-barrier discharge is generated is shortened from approximately 1 mm to 0.4 mm or less, so that the ozone concentration increases from 100 g/m$^3$ to 200 g/m$^2$ or more, and a high concentration ozone gas can be thereby generated. That is to say, the technique according to Patent Document 1 increases more than double the ozone generation volume density η. Today, a dielectric-barrier discharge is generated in a short gap length of 0.1 mm or less, so that a high concentration ozone of approximately 300 g/m$^3$ can be generated with the same gas flow rate.

In addition to the above configuration, Patent Documents 2 and 3, for example, describe a conventional technique indicative of an ozone generator made by laminating a discharge cell in which a super-thin water-cooled electrode is used.

In the technique of Patent Documents 2 and 3, an electrode thickness is thinned, and a configuration of a gas piping and a cooling water piping is simplified. Thus, in the technique according to Patent Documents 2 and 3, the ozone generation volume density is further enhanced compared with the technique according to Patent Document 1.

In a technique according to Patent Document 4, an ozone gas is generated using an oxygen gas including nitrogen as a raw material gas.

In the technique according to Patent Document 4, a small amount of NO$^2$ gas generated from a nitrogen gas and an oxygen gas mutually and chemically reacts with a discharge light in an dielectric barrier discharge field. Accordingly, an oxygen molecule can be effectively dissociated, and as a result, a high concentration ozone gas is generated.

Patent Document 5 describes a technique of generating a high concentration ozone gas from a high purity oxygen gas alone.

In the technique according to Patent Document 5, the high concentration ozone gas can be generated from the high purity oxygen gas alone using a mutual chemical reaction between a dielectric barrier discharge light and a photocatalyst.

As described above, the technique of generating the high concentration ozone gas is conventionally studied and developed.

PRIOR ART DOCUMENT

Patent Document

Patent Document 1: Japanese Patent Application Laid-Open No. 8-12304
Patent Document 2: Japanese Patent Application Laid-Open No. 2003-160310
Patent Document 3: Japanese Patent Application Laid-Open No. 2004-142963
Patent Document 4: Japanese Patent Application Laid-Open No. 2004-359537
Patent Document 5: Japanese Patent Application Laid-Open No. 2011-88821

SUMMARY OF INVENTION

Problems to be Solved by the Invention

Conventionally, an AC voltage is applied to a discharge cell having a discharge space to generate an ozone gas in the discharge space. Multiple discharge cells are laminated, so that a high-capacity ozone gas can be generated.

In a conventional ozone generation apparatus, a discharge cell has a configuration that two electrode surfaces face each other and a discharge space is formed between the electrodes. Accordingly, discharge surface is conventionally made up of one electrode surface facing the discharge space and other electrode surface facing the discharge space (that is to say, the one discharge cell includes one discharge space and the two discharge surfaces).

Thus, a method and means of increasing a generation efficiency of the ozone gas is limited to the following: "the discharge gap length is shortened", "irregularities are formed on the discharge surface", "a power density of the discharge is increased", and "the discharge surface is cooled to reduce a temperature of a discharge gas".

In addition to the above method and means, the followings are also considered to generate the high-capacity ozone gas: a material of a discharge surface having the high generation efficiency is researched, an amount of a raw material gas is increased, and a total number of generation apparatuses is increased, for example. However, the above method and means have problems that the whole apparatus is complicated and increased in size and cost.

The present invention therefore has an object to provide an ozone generation apparatus capable of increasing an ozone generation volume density at low cost without causing the generation apparatus to be complicated and increased in size.

Means for Solving the Problems

In order to achieve the above object, the ozone generation apparatus according to the present invention includes a discharge cell for generating a dielectric barrier discharge. The ozone generation apparatus generates ozone using the dielectric barrier discharge. The discharge cell includes a first electrode part, a second electrode part, and a dielectric partition plate. The second electrode part is disposed to face the first electrode part to form a space. The dielectric partition plate is provided between the first electrode part and the second electrode part to separate the space as two discharge spaces.

Effects of the Invention

The ozone generation apparatus according to the present invention includes a discharge cell for generating a dielectric barrier discharge. The ozone generation apparatus generates ozone using the dielectric barrier discharge. The discharge cell includes a first electrode part, a second electrode part, and a dielectric partition plate. The second electrode part is disposed to face the first electrode part to form a space.

The dielectric partition plate is provided between the first electrode part and the second electrode part to separate the space as two discharge spaces.

Accordingly, the two discharge spaces can be formed in the one discharge cell. That is to say, four discharge surfaces are formed in the one discharge cell. In the above manner, the discharge surface increases, so that the ozone gas generation amount generated in the one discharge cell (=high concentration×gas flow rate) is further enhanced. Moreover, the dielectric partition plate is inexpensive and is also easily provided in the discharge cell. Furthermore, since the dielectric partition plate is thin, only an extremely small space is needed. That is to say, the ozone generation apparatus according to the present invention enables a further increase of the ozone generation volume density at low cost while preventing the complication and increase in size of the generation apparatus.

BRIEF DESCRIPTION OF DRAWINGS

FIG. 4 An enlarged plan view showing a state where spacers 4 are radially disposed with respect to a dielectric partition plate 7.

PREFERRED EMBODIMENTS FOR IMPLEMENTING THE INVENTION

In a discharge cell of an ozone generation apparatus according to the present invention, a distance between electrode parts is 1 mm or less. An intermediate threshold surface made up of a dielectric (referred to as a dielectric partition plate hereinafter) is provided in a space between the electrode parts. Accordingly, in the space of one discharge cell, two discharge spaces in which a dielectric barrier discharge are generated, are generated, and a total number of discharge surfaces increases to four. In the ozone generation apparatus according to the present invention, the dielectric barrier discharge is uniformly formed in each discharge space of the one discharge cell to obtain a high generation amount of an ozone gas (an ozone generation volume density is increased).

The present invention is specifically described hereinafter based on drawings illustrating embodiments of the present invention.

<Embodiment 1>

Figure 1:
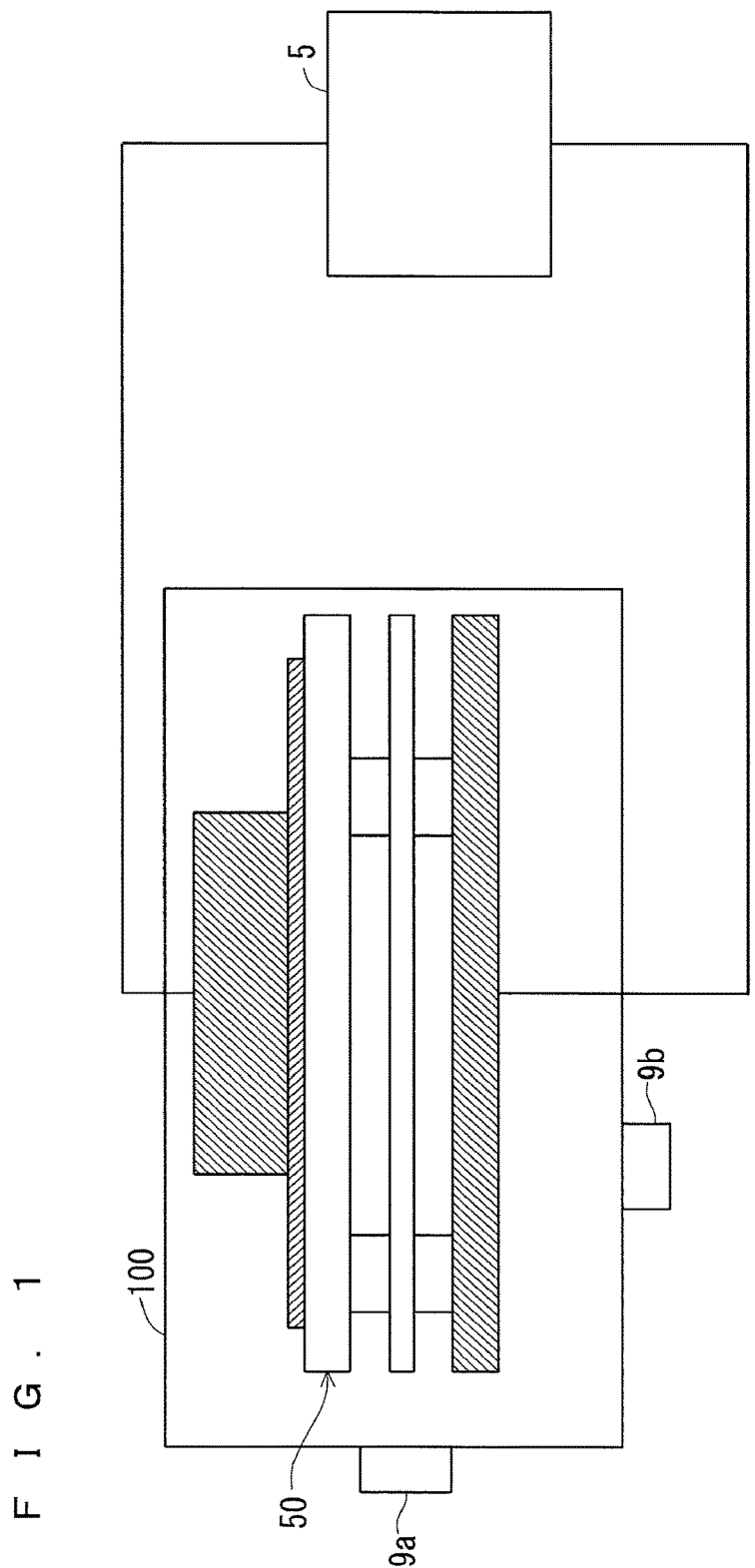
FIG. 1 A sectional view showing a configuration of an ozone generation apparatus 100 according to the present invention.
Figure 2:
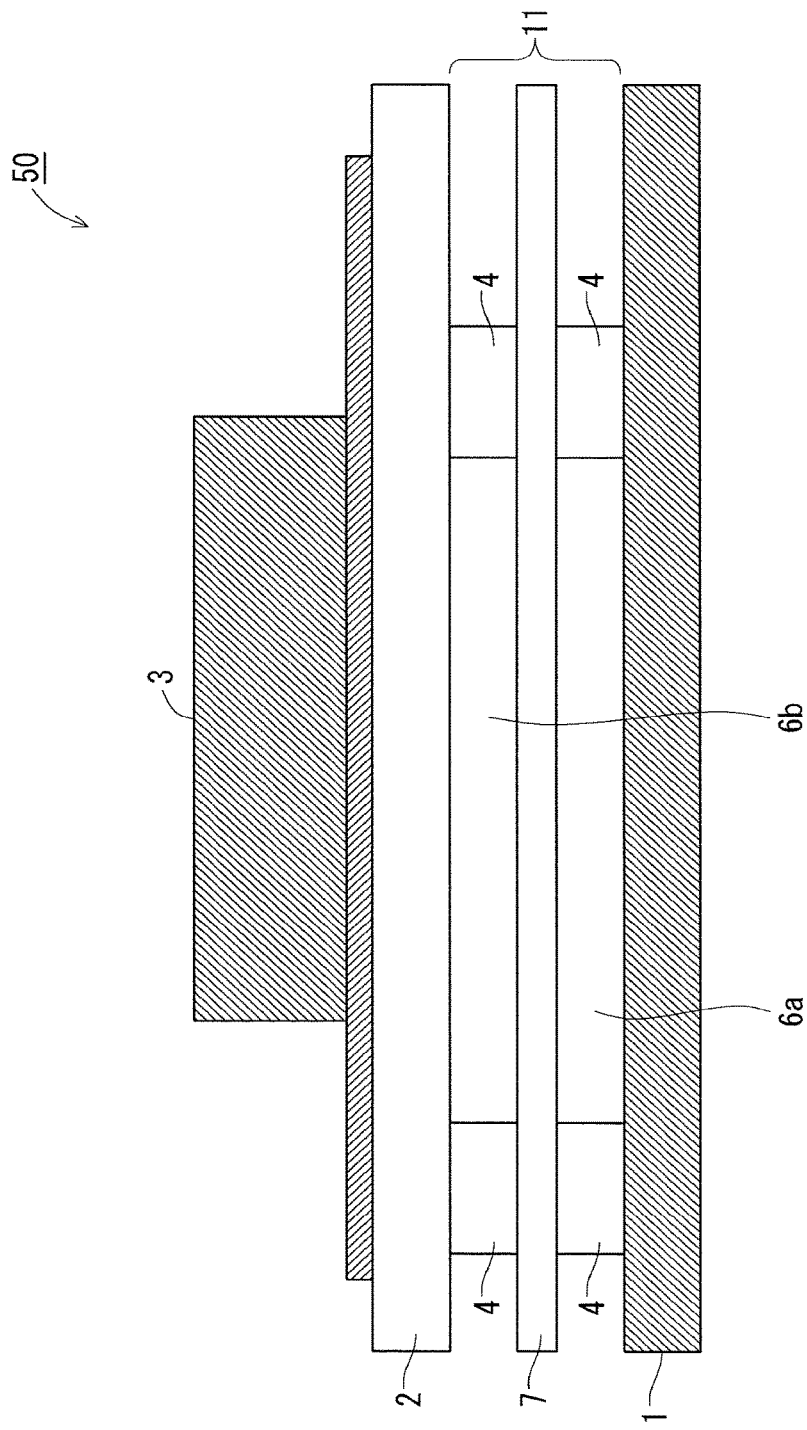
FIG. 2 An enlarged sectional view showing a configuration of a discharge cell 50 according to an embodiment 1.

FIG. 1 is sectional view showing a configuration of an ozone generation apparatus 100 according to the present embodiment. FIG. 2 is an enlarged sectional view showing a configuration of a discharge cell 50 provided in the ozone generation apparatus 100.

Herein, the configuration example shown in FIG. 1 shows the ozone generation apparatus 100 including one discharge cell 50. However, an ozone generation apparatus having a configuration that a plurality of discharge cells 50 are arranged or a configuration that a plurality of discharge cells 50 are laminated may also be adopted (when the configuration of including the plurality of discharge cells 50 is adopted, each discharge cell 50 has a configuration shown in FIG. 2).

As shown in FIG. 1, the discharge cell 50 is provided in the ozone generation apparatus 100. A dielectric barrier discharge is generated in the discharge cell 50. Then, an ozone gas is generated in the discharge cell 50 using the dielectric barrier discharge. A particular configuration of the discharge cell 50 is described hereinafter using FIG. 2.

A gas supply part 9a for supplying a raw material gas from outside into the ozone generation apparatus 100 is provided on a side surface of the ozone generation apparatus 100. A mixed gas made up of an oxygen gas as a main constituent and a small amount of nitrogen gas can be adopted as the raw material gas. Adopted is the configuration of supplying the raw material gas from the gas supply part 9a into the ozone generation apparatus 100 to evenly flow the gas from a surrounding part of the discharge cell, however, the detailed drawing is omitted here.

Using the mixed gas, the nitrogen gas enhances the oxygen molecule dissociation on the oxygen gas in a dielectric barrier discharge field. The higher concentration ozone gas is thereby generated.

A gas output part 9b for outputting the ozone gas outside from the ozone generation apparatus 100 is provided on a side surface of the ozone generation apparatus 100. Herein, the ozone gas is generated from the raw material gas in the discharge cell using the dielectric barrier discharge. Adoptable is a configuration of devising an electrode structure at a central part of a ground electrode (a low pressure electrode 1) in each discharge cell 50 to lead the ozone gas to the gas output part 9b, for example.

FIG. 1 shows an AC source 5 for applying an AC voltage to the discharge cell 50. The AC source 5 generates and outputs a high frequency AC voltage using an inverter. The AC source 5 controls the output current, thereby controlling an ozone amount generated in the discharge cell 50.

The ozone generation apparatus 100 is provided with, in addition to the above components, a gas flow rate regulator for adjusting a flow rate of the supplied raw material gas, a pressure regulator for adjusting a pressure in the ozone generation apparatus 100 (a pressure in the discharge field), and a measuring instrument for measuring a concentration of the generated ozone gas, for example. In FIG. 1, the illustration of these equipment is omitted from a viewpoint of simplification of the drawing.

Next, the configuration of the discharge cell 50 is described in detail using FIG. 2.

The discharge cell is formed by arranging the two electrode parts (a first electrode part and a second electrode part) to face each other.

In a configuration example of FIG. 2, a first electrode part 1 is made up of a low pressure electrode 1 which is a ground potential (the first electrode 1 is referred to as the low pressure electrode 1 hereinafter). The low pressure electrode 1 is electrically connected to one terminal of the AC source 5.

The low pressure electrode 1 is generally water-cooled or cooled using a cooling medium to resolve an influence of a discharge heat. In the configuration of FIG. 2, the illustration of the structure regarding the cooling is omitted from a viewpoint of simplification of the drawing.

As shown in FIG. 2, second electrode parts 2 and 3 are disposed to face the low pressure electrode 1 to form a space 11. In the configuration example of FIG. 2, the second electrode parts 2 and 3 are made up of a dielectric part 2 and a high pressure electrode 3. The low pressure electrode 1 is provided on one main surface side of the dielectric part 2 with the space 11 therebetween. Other main surface of the dielectric part 2 is connected to the high pressure electrode 3.

The high pressure electrode 3 is electrically connected to other terminal of the AC source 5. The high pressure electrode 3 and the dielectric part 2 are connected to each other. Accordingly, a high-pressure AC voltage is applied to the dielectric part 2 via the high pressure electrode 3. That is to say, the high-pressure AC voltage is applied between the low pressure electrode 1 and the dielectric part 2 by the AC source 5. The application of the AC voltage causes the generation of the dielectric barrier discharge in the space 11.

In the discharge cell 50 according to the present invention, as shown in FIG. 2, the dielectric partition plate 7 is provided in the space 11 formed between the low pressure electrode 1 and the dielectric part 2. Two discharge spaces 6a and 6b are formed in the space 11 by providing the dielectric partition plate 7. That is to say, the one discharge space 6a is formed between the low pressure electrode 1 and the dielectric partition plate 7, and the other discharge space 6b is formed between the dielectric part 2 and the dielectric partition plate 7.

As can be seen from the above, in the present invention, the dielectric partition plate 7 is introduced in the discharge cell 50, so that the two discharge spaces 6a and 6b are formed in the one discharge cell 50. A thickness of the dielectric partition plate 7 is approximately 1 mm, for example. A gap length in each of the discharge spaces 6a and 6b is 1 mm or less (more preferably, 0.4 mm or less).

The dielectric partition plate 7 is a member made up of the dielectric. The dielectric partition plate 7 may be a thin plate-like member or a thin plate-like member having a meshed pattern (having a net-like surface) (a mesh plate).

A spacer 4 is provided to keep the gap length in each of the discharge spaces 6a and 6b constant. That is to say, the spacer 4 is provided between the low pressure electrode 1 and the dielectric partition plate 7 to keep a distance between the low pressure electrode 1 and the dielectric partition plate 7 (the gap length of the discharge space 6a) constant. In a similar manner, the spacer 4 is provided between the dielectric part 2 and the dielectric partition plate 7 so that a distance between the dielectric part 2 and the dielectric partition plate 7 (the gap length of the discharge space 6b) is kept constant, the discharge is evenly generated, and the raw material gas is evenly flowed into the discharge spaces 6a and 6b.

As described above, the space 4 has a role to form the discharge spaces 6a and 6b. Accordingly, it is preferable to arrange the plurality of spacers 4 in each of the discharge spaces 6a and 6b from a viewpoint of keeping each gap length constant (more preferably, the plurality of spacers 4 are uniformly arranged).

When the AC voltage is applied to the discharge cell 50 using the AC source 5, a high-field dielectric barrier discharge is generated in each of the discharge spaces 6a and 6b. It is preferable that the gap length of each of the discharge spaces 6a and 6b is 1 mm or less to cause a higher concentration ozone gas to be generated in each of the discharge spaces 6a and 6b.

As described above, in the ozone generation apparatus 100 according to the present embodiment, the dielectric partition plate 7 is provided in the discharge cell 50.

Accordingly, the two discharge spaces 6a and 6b can be formed in the one discharge cell 50. That is to say, four discharge surfaces are formed in the one discharge cell 50.

In the above manner, the discharge surface increases, so that the concentration of the ozone gas generated in the one discharge cell 50 gets higher, and the ozone generation amount that can be output (=ozone generation concentration×gas flow rate) is thereby further enhanced. Moreover, the dielectric partition plate 7 is inexpensive and is also easily provided in the discharge cell 50. Furthermore, since the dielectric partition plate 7 is thin (approximately 1 mm), only an extremely small space is needed. That is to say, the ozone generation apparatus 100 according to the present embodiment enables a further increase of the ozone generation volume density $\eta$ at low cost while preventing the complication and increase in size of the generation apparatus.

In the meanwhile, also considered is a method that a metal plate is provided instead of the above dielectric partition plate 7 to form two discharge spaces in one discharge cell. The method that the metal plate is adopted is appropriate when the gap length in the discharge cell 50 is longer than 1 mm from a viewpoint of assembly, for example. However, when the gap length in the discharge cell 50 is short, the metal plate is not so preferable for a reason described below.

That is to say, the metal plate is more flexible and has a smaller heat capacity than the dielectric plate. Moreover, when the metal plate is introduced in the discharge cell, and a short circuit occurs in a part of the discharge spaces. Thus, when the metal plate is adopted, it is difficult to stably form the uniform dielectric barrier discharge by reason of the above matters.

A method that dielectrics are closely attached to both surfaces of the metal plate is also considered. However, when the above method is adopted, a flatness of the metal plate to which the dielectrics are closely attached cannot be ensured due to a difference between a heat conductivity of a metal material and a heat conductivity of a dielectric material. Moreover, a void may occur between the metal material and the dielectric material. Furthermore, a baking at a high temperature is necessary in the attachment of the dielectric to the metal plate, so that a warpage occurs in the metal plate due to the baking processing. Thus, by reason of the above matters, the method that the dielectrics are closely attached to the both surfaces of the metal plate is not so preferable from a viewpoint of the uniform generation of the dielectric barrier discharge in the discharge spaces 6a and 6b.

Accordingly, the method that the metal plate is adopted instead of the dielectric partition plate 7 is not so preferable.

Thus, the dielectric partition plate 7 which is a harder dielectric material of approximately 1 mm in thickness is adopted in the present invention. The flatness of the dielectric partition plate 7 is therefore kept accurate. Accordingly, when the AC voltage is applied to the discharge cell 50, the uniform dielectric barrier discharge is generated in each of the discharge spaces 6a and 6b via the dielectric partition plate 7.

Moreover, as described above, a net-like thin plate may also be adopted as the dielectric partition plate 7. When the net-like dielectric partition plate 7 is adopted, the discharge area increases, so that the ozone gas having the higher concentration can be generated, and the ozone generation amount that can be output (=ozone generation concentration×gas flow rate) is thereby further enhanced. That is to say, the ozone generation volume density $\eta$ can further be increased consequently.

The gap length in each of the discharge spaces 6a and 6b can be kept accurate by providing the plurality of spacers 4.

It is also applicable to provide the dielectric partition plate 7 and the spacer 4 as separate parts and assemble them. Moreover, the dielectric partition plate 7 and the spacer 4 may be integrally formed (integrated) using the same dielectric material. That is to say, it is also applicable to mold the dielectric partition plate 7 having a plurality of protruding parts on the both main surfaces thereof and cause the protruding parts to function as the spacers 4.

As described above, when the dielectric partition plate 7 and the spacer 4 are integrally formed, the discharge cell 50 is easily assembled, and in addition, an assembly accuracy is improved (in particular, the gap length can be set accurately).

<Embodiment 2>

Figure 3:
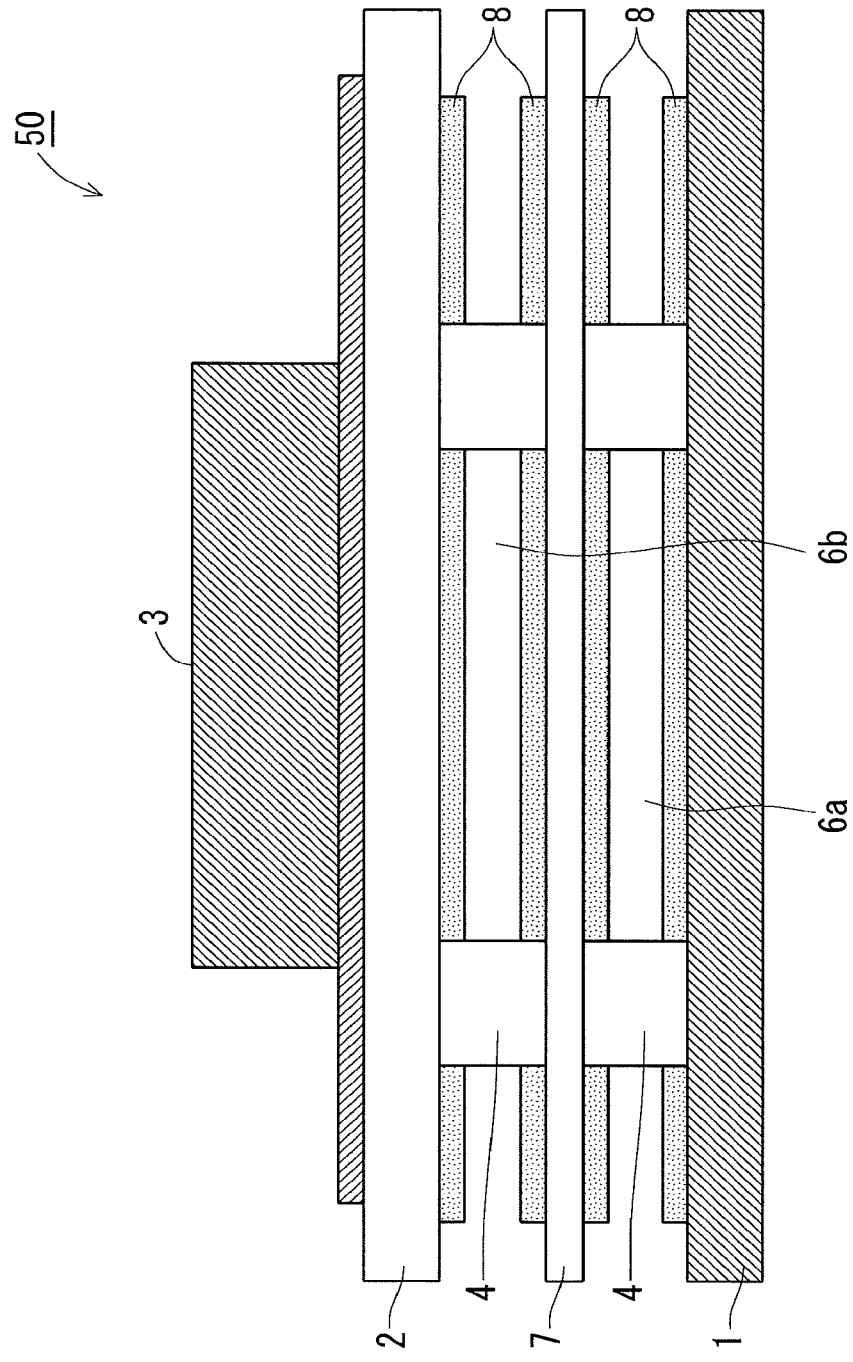
FIG. 3 An enlarged sectional view showing a configuration of a discharge cell 50 according to an embodiment 2.

FIG. 3 is an enlarged sectional view showing a configuration of a discharge cell 50 according to the present embodiment which is provided in the ozone generation apparatus 100.

As can be seen from a comparison of FIG. 2 with FIG. 3, the discharge cell 50 according to embodiment 1 and the discharge cell 50 according to the present embodiment have the same configuration except that a photocatalytic material 8 is added. Accordingly, a configuration of the discharge cell 50 shown in FIG. 3 is described hereinafter, regarding a part different from the discharge cell 50 shown in FIG. 2.

When the discharge cell 50 according to the present embodiment is provided in the ozone generation apparatus 100, a high-purity oxygen gas which does not contain the nitrogen gas may also be adopted as the raw material gas. That is to say, when the discharge cell 50 according to the present embodiment is adopted, the high concentration ozone gas can be generated even when the high-purity oxygen gas is supplied from the gas supply part 9a into the ozone generation apparatus 100.

As shown in FIG. 3, in the discharge cell 50 according to the present embodiment, the photocatalytic material 8 is formed on each of a main surface of the low pressure electrode 1 facing the discharge space 6a, both main surfaces of the dielectric partition plate 7 facing the discharge spaces 6a and 6b, and a main surface of the dielectric part 2 facing the discharge space 6b. That is to say, the photocatalytic materials 8 are formed on the four discharge surfaces.

A metal or a metal oxide may also be formed on the above four discharge surfaces instead of the photocatalytic material 8. The above metal or the metal oxide is altered to the photocatalytic material in a plasma discharge field. Molybdenum, chrome, and tungsten, for example, can be adopted as the metal. An oxide of the metal exemplified above can be adopted as the metal oxide.

As described above, in the present embodiment, the photocatalytic material 8 (or the metal or the metal oxide) is applied to the four discharge surfaces. Thus, when the high-purity oxygen gas enters the discharge cell 50, a discharge light energy of the dielectric barrier discharge is absorbed in the photocatalytic material 8 (or the altered photocatalytic material) formed on the four discharge surfaces. Thereby an interfacial chemical reaction between the oxygen gas and the photocatalytic material 8 is activated and a phenomenon that the oxygen molecule is dissociated into the oxygen atom is enhanced in the two discharge spaces 6a and 6b. The higher concentration ozone gas is thereby generated in the two discharge spaces 6a and 6b consequently.

<Embodiment 3>

It is described above that the plurality of spacers 4 are provided in the both main surfaces of the dielectric partition plate 7. The present embodiment relates to a specific arrangement method of the spacers 4. FIG. 4 is a plan view of the dielectric partition plate 7 according to the present embodiment viewed from an upper surface.

The plurality of spacers 4 according to the present embodiment shown in FIG. 4 is provided on the dielectric partition plate 7 in the discharge cell 50 described in the embodiments 1 and 2. Although the only one main surface of the dielectric partition plate 7 is illustrated in FIG. 4, the plurality of spacers 4 are also arranged in the similar manner on the other main surface.

As shown in FIG. 4, the spacers 4 are radially disposed from a center of the dielectric partition plate 7 toward outside thereof on the main surface of the dielectric partition plate 7 according to the present embodiment. A total number of spacers 4 is not limited to that exemplified in FIG. 4 but can be optionally selected.

A gas take-out part 30 for taking out the generated ozone gas may be provided in a central part of the dielectric partition plate 7 as shown in FIG. 4. Although the ozone gas taken out from the gas take-out part 30 passes through the dielectric partition plate 7 and is then output outside of the ozone generation apparatus 100, an illustration of a transmission path of the ozone gas is omitted.

When the dielectric partition plate 7 according to the present embodiment is applied, for example, the raw material gas is caused to enter the dielectric partition plate 7 from an outer periphery of the dielectric partition plate 7. The raw material gas is exposed to the dielectric barrier discharge field in the discharge spaces 6a and 6b on a way to the center of the dielectric partition plate 7, and the ozone gas is thereby generated. The ozone gas flows to the gas take-out part 30 provided in the central part of the dielectric partition plate 7 to be output to the ozone generation apparatus 100.

As described in the embodiment 1, the configuration that the dielectric partition plate 7 and the spacer 4 are integrally formed may also be adopted.

As described above, in the present embodiment, the plurality of spacers 4 are radially disposed with respect to the dielectric partition plate 7. The above configuration enables the efficient generation of the ozone gas in the discharge spaces 6a and 6b without an interference by the spacer 4 to the flow of the gas from the outer periphery of the dielectric partition plate 7 toward an inner part thereof.

The invention claimed is:

1. An ozone generation apparatus that includes a discharge cell in which a dielectric barrier discharge is generated to generate ozone using said dielectric barrier discharge, said discharge cell comprises:
    a first electrode part;
    a second electrode part being disposed to face said first electrode part to form a space; and
    a dielectric partition plate being provided between said first electrode part and said second electrode part to separate said space as two discharge spaces, the two discharge spaces including a first discharge space formed between the first electrode part and the dielectric partition plate, and a second discharge space formed between the second electrode part and the dielectric partition plate, wherein
    each of said first electrode part, said second electrode part, and said dielectric partition plate has a flat plate shape, and
    spacers for forming said two discharge spaces are integrally formed on said dielectric partition plate, said spacers keep a gap length in each of said two discharge spaces constant, wherein the gap length in each of the two discharge spaces is smaller than a thickness of the dielectric partition plate.

2. The ozone generation apparatus according to claim 1, wherein
said dielectric partition plate is a net plate.

3. The ozone generation apparatus according to claim 1, wherein
said spacers include a plurality of spacers.

4. The ozone generation apparatus according to claim 3, wherein
said spacers are radially disposed on said dielectric partition plate.

5. The ozone generation apparatus according to claim 1, wherein
a photocatalytic material is formed on said first electrode part facing said first discharge space, said dielectric partition plate facing said first discharge space, and said second electrode part facing said second discharge space.

6. The ozone generation apparatus according to claim 1, wherein
a metal or a metal oxide is formed on said first electrode part facing said first discharge space, said dielectric partition plate facing said first discharge space, and said second electrode part facing said second discharge space.

7. The ozone generation apparatus according to claim 1, wherein the gap length in each of the discharge spaces is less than 40% the thickness of the dielectric partition plate.

* * * * *